Figure 1:
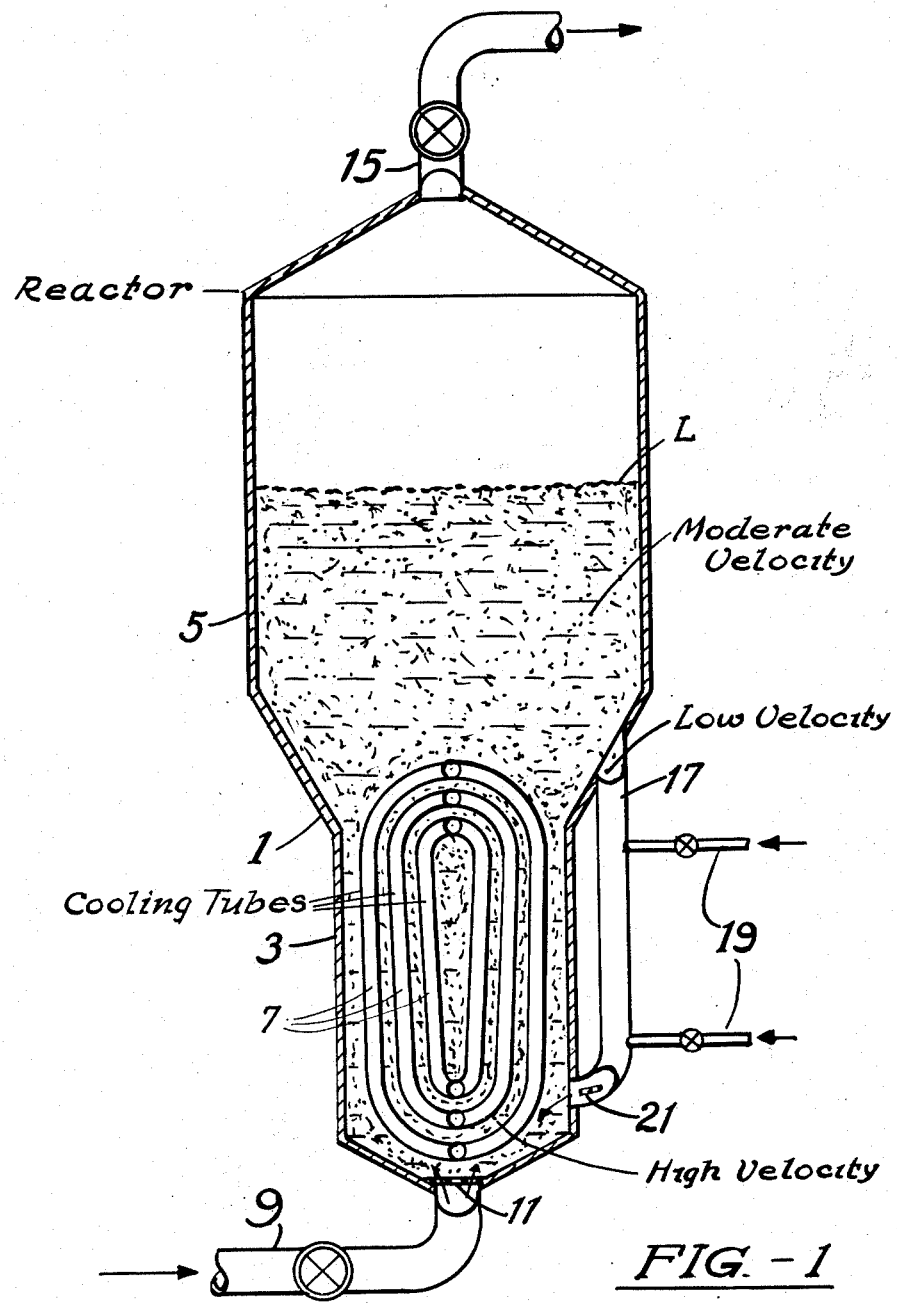

Patented Feb. 3, 1953

2,627,522

UNITED STATES PATENT OFFICE 2,627,522

METHOD AND APPARATUS FOR CARRYING OUT EXOTHERMIC CATALYTIC REACTIONS

Robert W. Krebs, Baton Rouge, La., and Warren K. Lewis, Jr., East Orange, N. J., assignors to Standard Oil Development Company, a corporation of Delaware Application October 29, 1948, Serial No. 57,366

7 Claims. (Cl. 260—449.6)

The present invention relates to a method and apparatus for carrying out exothermic catalytic reactions employing the so-called fluid catalyst technique wherein the catalyst is maintained in the form of a dense turbulent mass of finely divided solids fluidized by an upwardly flowing gas to resemble a boiling liquid. While the invention is applicable to all exothermic reactions of this type, such as hydrogenation, oxidation, catalyst regeneration by burning deactivating deposits, etc., it finds its greatest utility in the catalytic synthesis of normally liquid hydrocarbons and other valuable products from CO and $H_2$ in the presence of fluidized synthesis catalysts.

In exothermic fluid-type catalytic processes such as hydrocarbon synthesis it is necessary to remove heat of reaction from the fluidized catalyst mass in order to maintain desired temperature levels. The quantities of heat released per unit of time and reactor space by most of these reactions and particularly by the hydrocarbon synthesis reaction are extremely large. For example, in the iron catalyzed synthesis reaction some 60,000 B. t. u. of heat are released per 1,000 cu. ft. of hydrogen and carbon monoxide consumed. In addition, the synthesis reaction is extremely temperature sensitive. Optimum operation requires a temperature control by which the temperature may be kept substantially constant within relatively narrow ranges of, say, about 10°–50° F. Heat withdrawal means for this process therefore should be both highly efficient and flexible.

In conventional fluid-type synthesis operation, heat exchange equipment, normally in the form of heating coils or tubes, is immersed within the fluidized catalyst bed, by which the heat released is transferred to a suitable heat transfer medium, such as mixtures of diphenyl and diphenyl oxide, etc. However, in spite of the excellent heat transfer characteristics of the highly turbulent fluidized catalyst mass, the heat exchange surface required to remove all excess exothermic heat of reaction is so large that the fluidized bed cannot always accommodate sufficient heat transfer surface, unless uneconomically low feed gas rates per unit weight of catalyst are used to reduce the rate of heat release. In addition, catalyst hold-up in the reactor and with it solids-gas contact time are limited by the height of the heat exchange surfaces, whereby the flexibility of process control is markedly reduced. The presence of relatively large heat exchange surfaces in the dense fluidized catalyst bed reduces the degree of turbulence in all directions and thus may lead to unsatisfactory fluidization and undesirably large temperature differences within the catalyst mass.

It has also been proposed to control the temperature of exothermic reactions of the type here involved by continuously withdrawing catalyst from the fluidized bed in the reactor, cooling it outside the reactor substantially below reaction temperature in the form of a dense catalyst stream directly or indirectly contacted with a suitable cooling agent and returning the cooled catalyst to the reactor at a rate sufficient to maintain the reaction temperature at the desired level. Cooling of the catalyst in direct contact with the cooling agent may detrimentally affect the catalyst surface. Indirect cooling in this manner is inefficient because of the low heat transfer coefficient of the solids streams involved, necessitating excessive catalyst circulation rates and/or excessively large and expensive heat transfer surfaces. It also requires additional equipment and the supply of a gas aside from the process gases, for aeration and conveyance of the circulating catalyst.

The present invention overcomes the aforementioned difficulties and affords various additional advantages as will appear from the description hereinafter wherein reference will be made to the accompanying drawing.

It is, therefore, the principal object of the present invention to provide improved means for controlling the temperature of exothermic fluid-type catalytic reactions.

A more specific object of the invention is to provide improved means for controlling the temperature of the dense phase fluid-type catalytic synthesis of normally liquid hydrocarbons and other valuable products.

Other objects and advantages will appear hereinafter.

In accordance with the present invention, the exothermic fluid-type reaction zone is subdivided into at least two sections arranged in series with respect to the flow of reactants, the gaseous reactants are first passed at a relatively high velocity conducive to substantial catalyst entrainment, upwardly through a reaction zone section containing heat exchange surfaces immersed in the catalyst and then, at a relatively low velocity conducive to the formation of a dense fluidized catalyst phase, through a second reaction zone section which is free of heat exchange surfaces. Catalyst cooled substantially below optimum reaction temperature in the first section flows, entrained in the high velocity gases, continuously into the second section to absorb the heat of reaction released therein and catalyst from the second section is continuously returned to the first section for cooling, the rate of catalyst circulation being so controlled that optimum reaction temperatures are maintained in the second section. Suitable relative and absolute gas velocities in the two sections vary within wide ranges depending on the gas buoyancy of the catalyst particles, the reaction conditions, the efficiency of the heat transfer equipment, and the reactor design. It may be stated quite generally, however, that the superficial linear gas velocity in the low velocity section should be a small fraction, say, about $1/4$–$1/20$ of that in the high velocity section. Absolute velocities will range from about 0.1–2.0 ft. per second in the low velocity section and about 0.3–10 ft. per second in the high velocity section, for most conventional supported and unsupported catalysts, specific values depending on the gas buoyancy of the catalyst particles of a fluidizable size which may fall within the broad range of, say, 20–500 microns.

Important advantages are secured by this method of operation. At the high gas velocity in the first section, the heat transfer coefficient between the gas-solids phase and the heat exchange surface is substantially greater than in conventional dense phase operation, permitting a considerable reduction of the requirements of heat transfer area. The improved turbulence in the first section permits the use of low temperatures of the heat transfer medium confined by the heat transfer surfaces. Local condensation is eliminated because of the high turbulence and because little reaction takes place in the zone of heat transfer. Thus, the temperature differential between heat transfer medium and catalyst may be increased, which further reduces the heat transfer area required. The lower temperature of the heat transfer medium has the further advantage of permitting the maintenance of reaction temperatures considerably higher than the boiling point of the heat transfer medium without requiring excessive pressures on the heat transfer medium. Thus, water may be used in many cases in which more expensive media were previously required. The steam thus produced may be used directly in other portions of the plant.

The second section, in which most of the reaction takes place, is unobstructed by heat exchange surfaces whereby perfect fluidization conditions and heat distribution are assured in dense phase operation. The catalyst level in the second section may be varied over a large distance without affecting the efficiency of heat withdrawal. Thus, greatest flexibility is provided with respect to catalyst hold-up and contact time. The dense fluidized catalyst phase in the second section may have a ratio of length over diameter as low as it is desirable for optimum mixing and uniformity of temperature distribution.

In accordance with a preferred embodiment of the invention, the high velocity and low velocity zones form superimposed sections of a vertical reaction vessel. The low velocity zone may have a larger diameter than the high velocity zone, whereby the difference in gas velocity between the two zones may be accentuated beyond that established by the presence of the heat exchange surfaces which occupy a substantial portion of the free space within the first zone.

The two zones may be separated by a suitable gas-solids distributing means to assure a uniform distribution of the upflowing relatively cool solids-in-gas suspension within the dense low velocity phase. In processes involving a recycle of unreacted gases and/or a portion of the reaction products, at least a substantial portion of the fresh reactants may be supplied directly to the second, low velocity zone, while all or at least a substantial portion of the recycle stream may be charged to the bottom of the high velocity zone. In single pass operation, the feed of reactants may be split between high velocity and low velocity zones in the manner most suitable for optimum process control and conversion conditions. Catalyst circulation from the low velocity dense phase zone to the high velocity cooling zone preferably takes place under the pseudohydrostatic pressure exerted by the dense catalyst phase in the low velocity zone and leads from a lower portion of the low velocity section to a lower portion of the high velocity section over a path which may be located partly or wholly within or outside either or both reaction zone sections.

Figure 2:
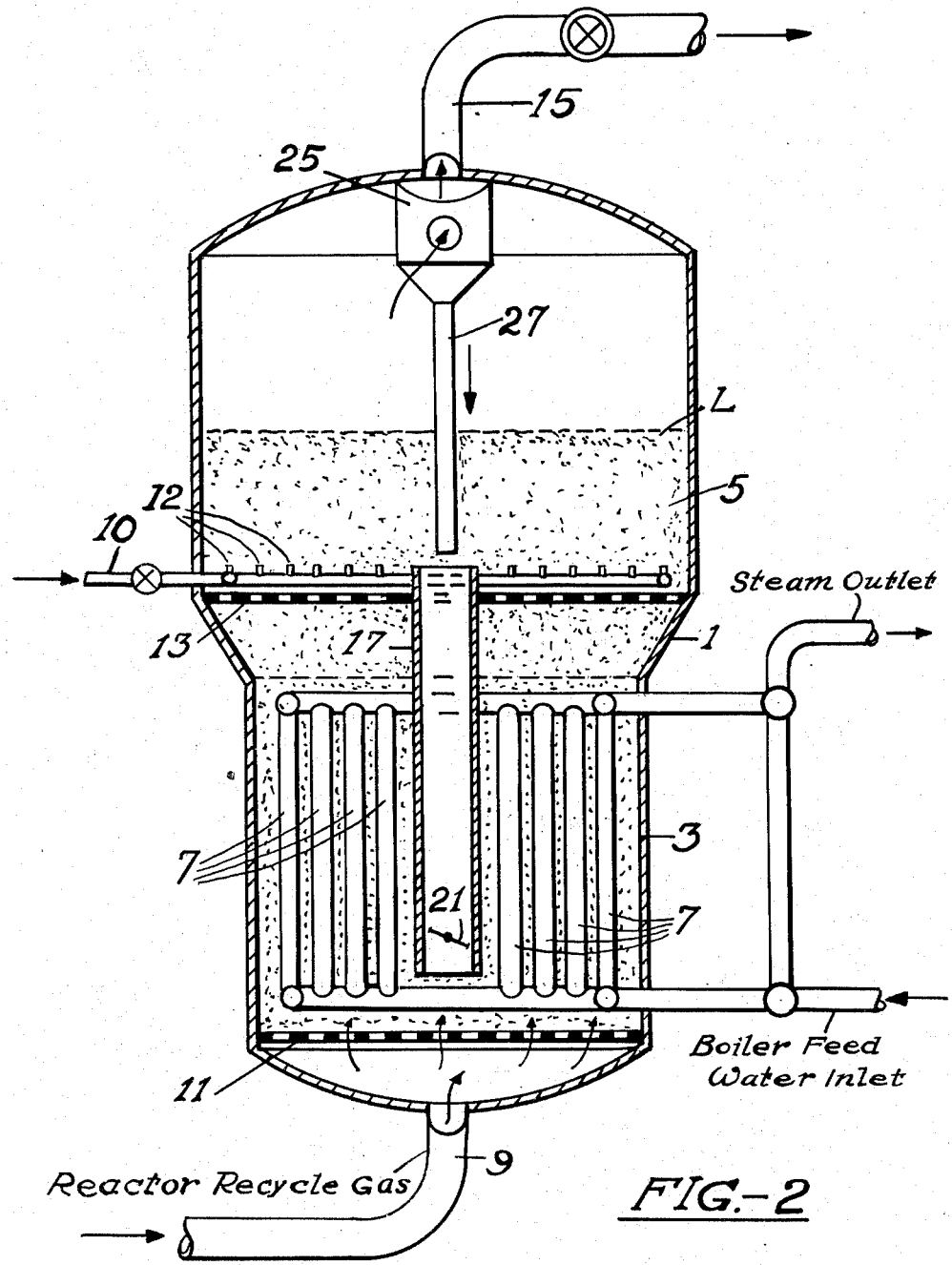

Having set forth its objects and general nature, the invention will be best understood from the more detailed description hereinafter and from the drawing in which Figure 1 is a semi-diagrammatical illustration of a system suitable for carrying out a preferred embodiment of the invention; and Figure 2 is a similar illustration of a slightly modified system of the same general type.

Referring now in detail to Figure 1, the system illustrated therein essentially comprises a vertical catalytic reactor 1 having a lower high velocity section 3 and an upper low velocity section 5, section 3 being provided with internal cooling coils 7. The functions and cooperation of these elements will be forthwith described using the dense phase fluid-type catalytic synthesis of normally liquid hydrocarbons and other valuable products in the presence of an unsupported iron-type catalyst as an example. It should be understood, however, that the system may be used in connection with other catalysts and for other exothermic catalytic reactions in a substantially analogous manner.

In operation, reactor 1 may be supplied with an iron-type synthesis catalyst such as reduced sintered pyrites ashes, reduced sintered red iron oxide, reduced fused magnetite, etc. which may be promoted with about 0.5%–3% of an alkali-metal promoter in the form of potassium or sodium carbonates or halides, or the like, and small amounts of other promoters such as alumina, if desired. The particle size of the catalyst may be about 20–200 microns, predominantly 50–100 microns. Sufficient catalyst should be present to permit the formation in section 5 of a dense fluidized catalyst phase having an apparent density of about 50–150 lbs. per cu. ft. and affording a gas-solids contact time of at least 4–10 seconds and the simultaneous formation in section 3 of a relatively dilute phase having an apparent density of about 20–75 lbs. per cu. ft. and covering the height of coils 7 substantially completely.

Synthesis gas which may contain $H_2$ and $CO$ in the ratio of about 0.5–3 is supplied at the desired operating pressure of, say, about 150–500 lbs. per sq. in. through line 9 to the lowermost portion of section 3, if desired by means of a suitable distributing means such as a grid 11. The superficial linear velocity of the gas within section 3 is maintained at about 2-10 ft. per second at the particle sizes specified above so as to establish an apparent catalyst density of about 20-75 lbs. per cu. ft. and a marked upward motion of catalyst in section 3.

During the turbulent upward flow of the catalyst-gas suspension through section 3 the synthesis reaction proceeds and releases heat, a substantial portion of which is transferred to cooling coils 7. Boiling water may be used as a cooling medium at a temperature of about 200°–400° F. and sufficient heat exchange surface may be provided to establish a catalyst temperature of about 400°–600° F. in section 3. Some 10–50 sq. ft. of transfer surface per million B. t. u./hr. of heat removed are adequate for this purpose at the conditions stated.

At a point above cooling coils 7 the gas velocity is reduced to about 0.3–1.5 ft. per second as a result of the larger space provided by the absence of heat exchange surfaces. This reduction in gas velocity may be enhanced by enlarging the cross-section of section 5 as shown in the drawing. At these lower gas velocities the catalyst forms a fluidized mass having a relatively high density of about 50–150 lbs. per cu. ft. and a well defined upper level L. The synthesis reaction is substantially completed in this dense catalyst phase, an optimum reaction temperature between about 500° and 700° F. being maintained in section 5 by a proper control of the supply of cool catalyst from section 3. Reaction products may be withdrawn through line 15 to be further treated in any conventional manner.

Hot fluidized catalyst is withdrawn from section 5, preferably from a low portion thereof, and returned under the pseudo-hydrostatic pressure of the catalyst phase in section 5, through a standpipe 17 to a lower portion of section 3 at the same rate at which catalyst is transferred from section 3 to section 5. Standpipe 17 may be aerated with small amounts of inert or recycle gas supplied through taps 19 to maintain the catalyst in pipe 17 in a free flowing state and simultaneously to strip unconverted synthesis gas from the catalyst. Aerating gas velocities of about 0.03–0.3 ft. per second are suitable for this purpose. The solids flow through pipe 17 may be controlled by any suitable means such as damper 21.

When equilibrium is established, catalyst may be circulated at a rate of about 10–50 tons per hour per million B. t. u. per hour of heat removed in section 3, at the conditions referred to above.

The system illustrated in Figure 2 is generally similar in design and operation to that of Figure 1, like system elements being designated by like reference characters. The description of this system may, therefore, be limited to points of difference.

Figure 2 differs essentially from Figure 1 in that the former shows a separation of section 5 from section 3 by means of a distributing grid 13 and that means are provided for split gas feed, one portion being supplied directly to the bottom of section 5 by way of line 10 and a gas distributing means such as spider 12. Minor differences are the location of pipe 17 within sections 3 and 5 rather than outside these sections as shown in Figure 1 and the presence of gas-solids separation means such as cyclone 25 with solids return pipe 27 in the upper portion of section 5.

The arrangement shown in Figure 2 may be used whenever a split gas feed is desirable. This may be of particular advantage in operations involving recycling of unconverted reactants to the reaction zone. Such recycle streams usually contain the reactants in a relatively low concentration and/or in proportions inadequate for maximum reaction rates. Commercial hydrocarbon synthesis frequently involves such recycle operation.

When employing the system of Figure 2 for this purpose the recycle stream, the rate of which is usually several times, say, about 2–5 times that of the fresh feed gas, is preferably wholly or predominantly supplied through line 9 to the section 3 to establish therein the conditions described in connection with Figure 1. As a result of the lesser reactivity of this recycle gas, wax formation is substantially reduced in section 3 and hence heat transfer is improved. The fresh synthesis gas feed is supplied through line 10 and spider 12 and operation may then proceed as described with reference to Figure 1. Use of cyclone 25 facilitates the separation of entrained solids from the reaction products.

The systems illustrated in the drawing permit of various modifications; for example sections 3 and 5 may be arranged in separate reactors connected by suitable pipes and not necessarily in a superimposed relationship, provided heat exchange elements are arranged only in one reactor and the differences in gas velocities and temperatures critical for the present invention are maintained. Other modifications within the scope of the invention may appear to those skilled in the art.

The foregoing description and exemplary operations have served illustrative purposes only. They are not intended to be limiting in scope.

What is claimed is:

1. In the process of synthesizing hydrocarbons by reacting carbon monoxide and hydrogen at a desirable reaction temperature in the presence of a dense turbulent mass of finely divided synthesis catalyst fluidized by gaseous reactants flowing upwardly at a fluidizing velocity of about 0.1–2 ft. per second, to resemble a boiling liquid having a well defined upper level, the improved method of maintaining said reaction temperature at a desired level which comprises passing a portion of the gaseous reactants at a velocity about 4–20 times higher than that fluidizing velocity upwardly through a first contacting zone containing synthesis catalyst particles of fluidizable size in turbulent suspension, maintaining a heat exchange fluid in indirect heat exchange relation to said turbulent suspension in order to cool said catalyst particles to a temperature substantially lower than said desirable reaction temperature, starting said reaction in said contacting zone, controlling said higher velocity so that said catalyst particles move upwardly through said zone in turbulent flow, discharging the effluent mixture of gas and catalyst particles from said first contacting zone upwardly into a second contacting zone, separately supplying fresh synthesis gas to the lower part of said second contacting zone, controlling superficial velocity of vaporous constituents through said second contacting zone to form a dense, fluidized mass of catalyst particles having a definite level, carrying out a substantial conversion of carbon monoxide and hydrogen to hydrocarbon materials in said second contacting zone, withdrawing products of reaction from said second contacting zone, separating normally gaseous materials from the reaction mixture and recycling the separated normally gaseous materials to said first contacting zone, conveying catalyst from said second to said first contacting zone under the pseudo-hydrostatic pressure of said fluidized mass, and controlling the circulation of catalyst between said zones at such a rate that said desirable reaction temperature is maintained in said second contacting zone by the cooling effect of said catalyst particles supplied from said first contacting zone.

2. The process as defined in claim 1 in which the catalyst is an unsupported iron-type synthesis catalyst.

3. The process as defined in claim 1 in which the catalyst is an unsupported iron-type catalyst having a particle size within the range of from about 20 to 200 microns, the superficial vapor velocity in the second contacting zone is about 0.3–1.5 ft. per second and the superficial vapor velocity through the first contacting zone is about 2.0–10 ft. per second.

4. The process as defined in claim 3 in which the reaction mixture in the second contacting zone is maintained at a temperature of about 500°–700° F. and the temperature of the suspension of catalyst in recycle gas discharged from the first contacting zone into the second contacting zone is about 400°–600° F.

5. The process as defined in claim 4 in which the catalyst is circulated from the second contacting zone, through the first contacting zone and back into the second contacting zone at the rate of about 10 to 50 tons per hour per million B. t. u. per hour of heat removed in said first contacting zone.

6. The process as defined in claim 5 in which the heat exchange fluid is boiling water.

7. An apparatus for carrying out exothermic dense phase fluidized catalyst solids reactions which comprises a single vertical reactor vessel closed at the top and bottom, an inlet for gaseous materials connected to the bottom of the vessel and an outlet for vaporous products connected to the top of the vessel, said vessel having an enlarged upper section defining an unobstructed space for the fluidization of finely divided solid catalytic material and a lower section of substantially smaller cross-sectional area, a perforated distribution grid near the bottom of the vessel for effecting even distribution of the incoming gaseous material over the entire cross section of the lower section of the reaction vessel, a perforated distribution plate at the bottom of said enlarged upper section for distributing suspension of solids and vapors discharged from the lower section into said enlarged upper section uniformly over the entire cross section of said upper section, heat exchange tubes arranged in the lower section, a standpipe having its upper end extending just above the perforated distribution plate at the bottom of the upper section and its lower end arranged a short distance above the grid at the bottom of the lower section of the reaction vessel and gas distributor means arranged just above the perforated distribution plate at the bottom of the enlarged upper section of the reaction vessel for the introduction of fresh gaseous reactants into the upper part of the reaction vessel.

ROBERT W. KREBS.
WARREN K. LEWIS, Jr.

REFERENCES CITED

The following references are of record in the file of this patent:

UNITED STATES PATENTS

| Number | Name | Date |
|---|---|---|
| 2,347,682 | Gunness | May 2, 1944 |
| 2,358,039 | Thomas et al. | Sept. 12, 1944 |
| 2,360,787 | Murphree et al. | Oct. 17, 1944 |
| 2,363,874 | Krebs | Nov. 28, 1944 |
| 2,373,008 | Becker | Apr. 3, 1945 |
| 2,414,276 | Sensel | Jan. 14, 1947 |
| 2,446,426 | Layng | Aug. 3, 1948 |
| 2,451,879 | Scharmann | Oct. 19, 1948 |
| 2,463,912 | Scharmann | Mar. 8, 1949 |
| 2,488,406 | Hirsch | Nov. 15, 1949 |